(12) United States Patent
Togashi

(10) Patent No.: US 6,970,342 B1
(45) Date of Patent: Nov. 29, 2005

(54) MULTILAYER CAPACITOR

(75) Inventor: Masaaki Togashi, Yuri-gun (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/113,193

(22) Filed: Apr. 25, 2005

(30) Foreign Application Priority Data

May 31, 2004 (JP) .............................. 2004-161825

(51) Int. Cl.[7] ..................... H01G 4/005; H01G 4/06; H01G 4/228
(52) U.S. Cl. .................... 361/303; 361/311; 361/306.3
(58) Field of Search ............................... 361/303–304, 361/306.1, 306.3, 308.1, 311–313, 321.1, 361/321.2

(56) References Cited

U.S. PATENT DOCUMENTS

| | | | |
|---|---|---|---|
| 3,838,320 A * | 9/1974 | Klein | 361/303 |
| 3,896,354 A * | 7/1975 | Coleman et al. | 361/321.2 |
| 5,880,925 A * | 3/1999 | DuPre et al. | 361/303 |
| 5,883,780 A * | 3/1999 | Noji et al. | 361/303 |
| 6,091,598 A * | 7/2000 | Kobayashi | 361/303 |
| 6,331,930 B1 * | 12/2001 | Kuroda et al. | 361/306.3 |
| 6,473,292 B1 * | 10/2002 | Yoshida et al. | 361/321.2 |
| 6,577,491 B1 * | 6/2003 | Ohtsuka et al. | 361/306.3 |
| 2004/0179325 A1 * | 9/2004 | Togashi et al. | 361/306.3 |

FOREIGN PATENT DOCUMENTS

JP        A 2002-164256        6/2002

* cited by examiner

Primary Examiner—Eric W. Thomas
(74) Attorney, Agent, or Firm—Oliff & Berridge, PLC

(57) ABSTRACT

A multilayer capacitor configured of internal electrodes, each of which has a similar shape that is continuous and has a pair of parallel parts extending parallel to one another. First and second ends of each internal electrode are formed at different positions from those of the other internal electrodes in the stacking direction of the dielectric layers. Each of the internal electrodes has a width W1 that is substantially uniform from the first end to the second end and a length L of a path running through the center of the width W1 from the first to the second end, such that the length L and the width W1 satisfy the expression $8 \leq L/W1 \leq 33$. With this construction, the equivalent series resistance (ESR) of the multilayer capacitor can be maintained within a suitable range, making it possible to obtain a desired value of ESR.

5 Claims, 5 Drawing Sheets

MULTILAYER CAPACITOR

BACKGROUND OF THE INVENTION

1. Field of the Invention

The present invention relates to a multilayer capacitor, and more particularly to a multilayer capacitor capable of easily acquiring an equivalent series resistance of a desired value.

2. Description of the Related Art

In recent years, central processing units (CPUs) provided in digital electronic equipment have been moving toward lower voltages and higher load currents. Therefore, in the power source for supplying an electric power to the CPU, it is difficult to keeping voltage fluctuations within an allowable range to a rapid change of the load current supplied to the CPU.

FIG. 1 shows a conventional power circuit 200 for a CPU 203. The power circuit 200 includes a multilayer ceramic capacitor 201 called a decoupling capacitor that is connected to a power source 202. The multilayer capacitor 201 is provided with an equivalent series resistance (ESR) and an equivalent series inductance (ESL). During transient changes in a load current I flowing from the power source 202 to the CPU 203, a current is supplied from the multilayer capacitor 201 to the CPU 203 in order to regulate voltage fluctuations in the power source 202.

Further, as the operating frequency in today's CPUs continues to improve, there is an increasing demand for larger load currents and a fast transient response. The ESR and ESL of the multilayer capacitor 201 have a great influence on voltage fluctuations in the power source 202. It is well known in the art that the effects of the ESR and ESL on voltage fluctuations in the power source 202 can be decreased by reducing the ESL and increasing the ESR. Various types of multilayer capacitors capable of reducing the ESL and increasing the ESR have been proposed.

For example, Japanese unexamined patent application publication No. 2002-164256 proposes a multilayer capacitor. The multiplayer capacitor has a dielectric element with a plurality of stacked sheet-like dielectric layers, interlayer electrodes disposed between adjacent dielectric layers, and a plurality of external electrodes connected to each interlayer electrode. Each interlayer electrode is configured of an internal electrode and an extraction electrode. Each internal electrode is shaped substantially alike in a continuous shape having a pair of parallel parts extending parallel to each other. The positions of first and second ends of the internal electrodes are different for each electrode in the stacking direction of the dielectric layers. Further, the extraction electrodes extend from the first end of each internal electrode to the external electrodes and are connected to the external electrodes.

However, while conventional multilayer capacitors have been successful in reducing ESL and increasing ESR, they have difficulty setting the ESR to a value appropriate for a prescribed ESL. If the ESR value is too small for the prescribed ESL value, ringing can occur; if too large, a charging/discharging current is inhibited.

SUMMARY OF THE INVENTION

In view of the foregoing, it is an object of the present invention to provide a multilayer capacitor capable of controlling the ESR value, capable of easily setting an optimal ESR value for a prescribed ESL value, and capable of further suppressing voltage fluctuations in the power source.

This and other object of the present invention with be attained by providing a multilayer capacitor including a dielectric element, internal electrodes, extraction electrodes, and external electrodes. The dielectric element has stacked sheet-like dielectric layers and has an outer surface. Each internal electrode is disposed between adjacent dielectric layers and within the dielectric element. Each internal electrode is in elongated shape with a first end and a second end and has a length L from the first end to the second end and a width W orthogonal to the direction of the length L. Each extraction electrode is disposed on the first end of each internal electrode leading the internal electrode to the outer surface of the dielectric element. Each external electrode is connected to each internal electrode via each extraction electrode. The length L is the length of the internal electrode along the center of the width W, and the length L and the width W of the internal electrodes are set such that $8 \leq L/W \leq 33$.

BRIEF DESCRIPTION OF THE DRAWINGS

The above and other objects, features, and advantages of the invention will become more apparent from reading the following description of the preferred embodiments taken in connection with the accompanying drawings in which.

DESCRIPTION OF THE PREFERRED EMBODIMENTS

Figure 1:
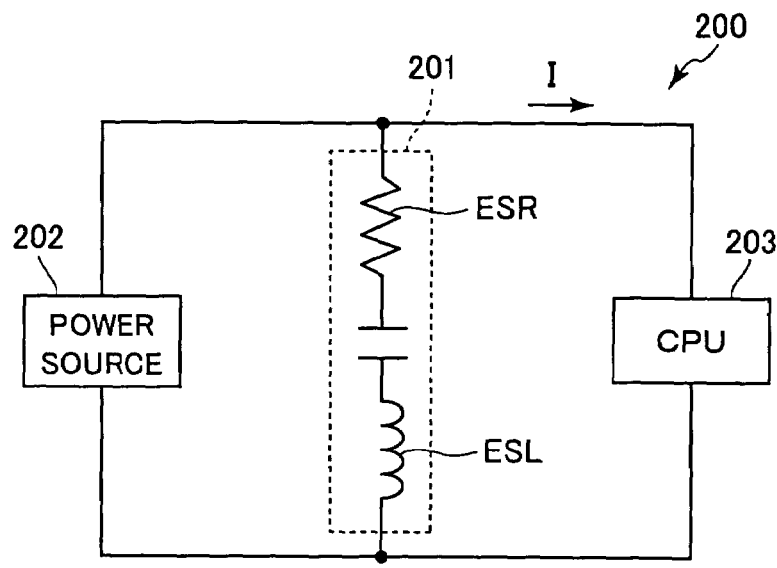
FIG. 1 is an equivalent circuit for a power supply circuit of a CPU when applying a conventional multilayer ceramic capacitor.
Figure 2:
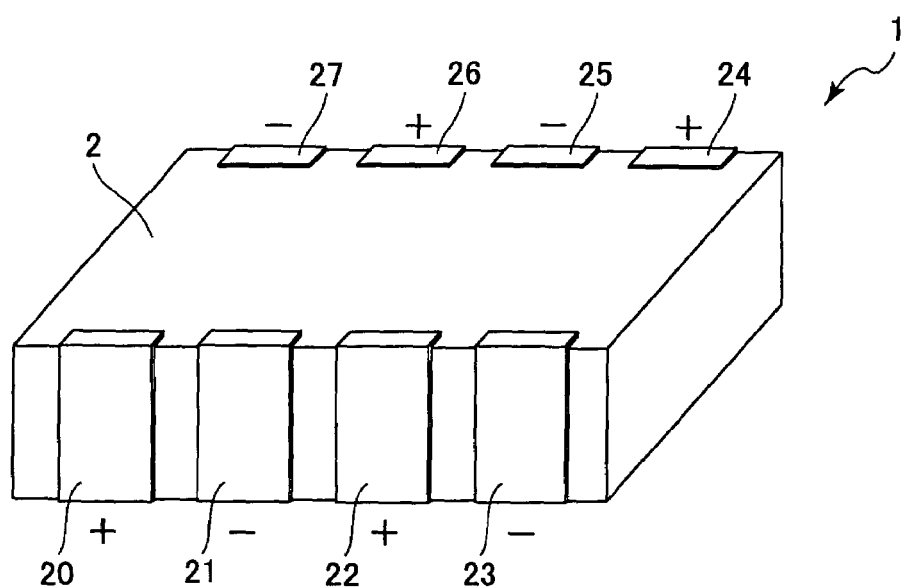
FIG. 2 is a perspective view of a multilayer capacitor according to a first embodiment of the present invention.
Figure 3:
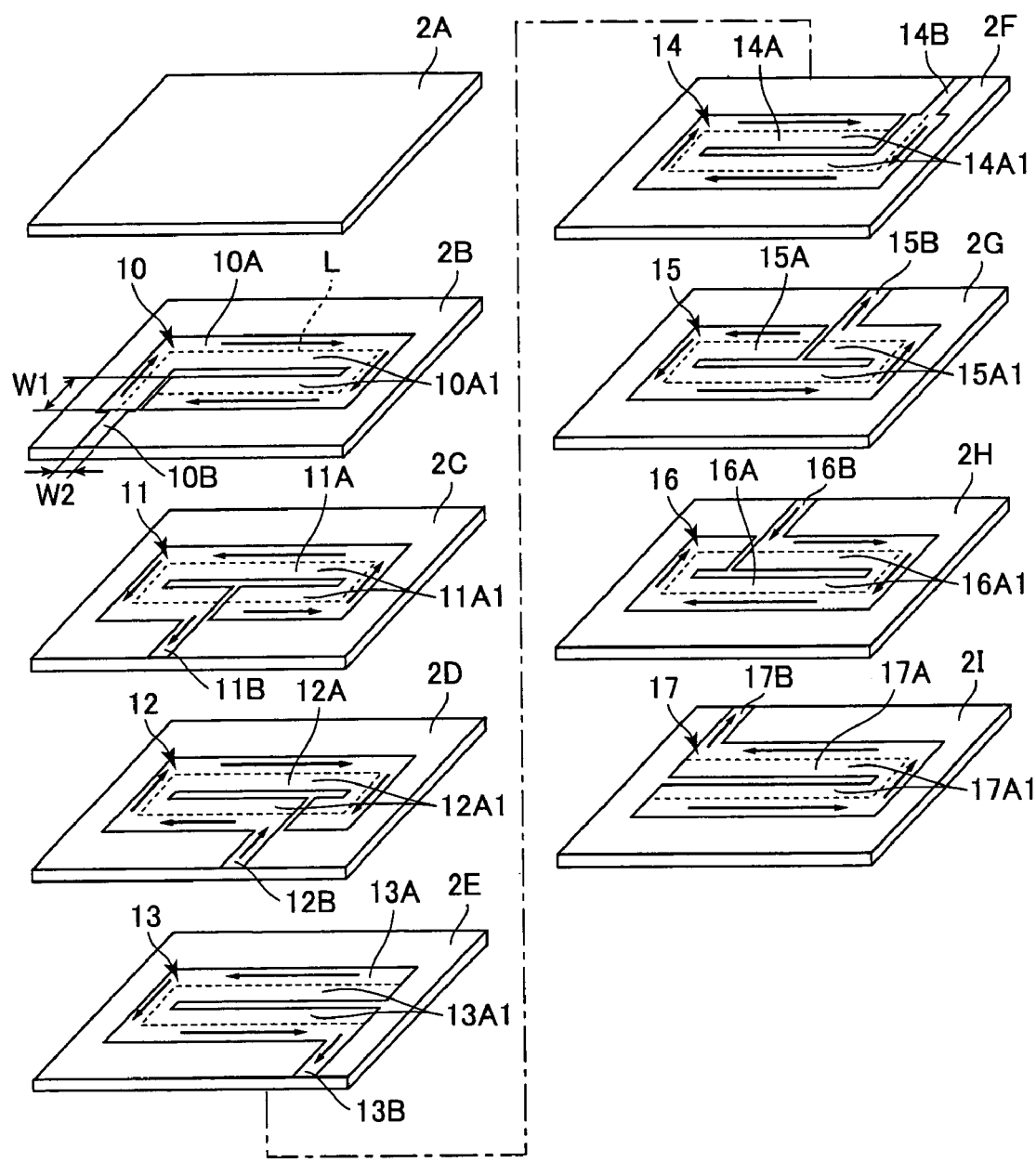
FIG. 3 is an exploded perspective view of the multilayer capacitor according to the first embodiment.

A multilayer capacitor according to a first embodiment of the present invention will be described while referring to FIGS. 2 through 5. As shown in FIGS. 2 and 3, a multilayer capacitor 1 includes a dielectric element 2 formed of stacked sheet-like dielectric layers 2A–2I, first through eighth electrodes 10–17 disposed between adjacent dielectric layers 2A–2I, and eight external electrodes 20–27 connected to the first through eighth electrodes 10–17, respectively.

The dielectric element 2 is manufactured by sintering the dielectric layers 2A–2I which is ceramic green sheets in a stacked formation. The first through eighth electrodes 10–17 are disposed on each of the dielectric layers 2B–2I, but not on the dielectric layer 2A. The first through eighth electrodes 10–17 are formed of a base metal such as nickel or a nickel alloy, copper or a copper alloy, or a metal alloy having one of these metals as the primary component. The first through eighth electrodes 10–17 are provided with respective internal electrodes 10A–17A and extraction electrodes 10B–17B.

The internal electrodes 10A–17A are each formed in a continuous shape with a pair of parallel parts 10A1–17A1, respectively, extending parallel to each other. Each of the internal electrodes 10A–17A is substantially similar in shape. Further, positions of one ends (first ends) of the internal electrodes 10A–17A are different from one another, and positions of other ends (second ends) of the internal electrodes 10A–17A are different from one another. Each of the internal electrodes 10A–17A is formed with a substantially uniform width W1 from the first end to the second end and has a path of a length L running along the center of the width W1 from the first end to the second end (indicated by a dotted line in FIG. 3). The width W1 is indicated only for the internal electrode 10A in FIG. 3. The dimensions of the length L and width W1 satisfy the expression $8 \leq L/W1 \leq 33$, and the width W1 is greater than or equal to 100 μm.

Each extraction electrodes 10B–13B is extending from one end of the internal electrodes 10A–13A, respectively, and from positions not overlapping one another in the stacking direction of the dielectric layers 2B–2E to the external electrodes 20–23. Each extraction electrodes 14B–17B is also extending from one end of the internal electrodes 14A–17A, respectively, and from positions not overlapping one another in the stacking direction of the dielectric layers 2F–2I to the external electrodes 24–27 on the opposite side of the external electrodes 20–23. As shown in FIG. 3, the extraction electrodes 10B–17B have a width W2 satisfying the expression $W1 \geq W2$. The width W2 is indicated only for extraction electrode 10B in FIG. 3.

The external electrodes 20–23 are formed on three outer surfaces of the dielectric element 2 and are connected to the extraction electrodes 10B–13B, respectively, but are separated from each other. The remaining external electrodes 24–27 are also formed on three outer surfaces of the dielectric element 2 at positions opposing the external electrodes 20–23 and are connected to the extraction electrodes 14B–17B, respectively, but are separated from each other. The multilayer capacitor 1 having this construction is incorporated in a power supply circuit 30, such as that shown in FIG. 4, by connecting the external electrodes 20, 22, 24, and 26 to a power source 31 and the external electrodes 21, 23, 25, and 27 to a ground, so that the internal electrodes 10A–17A constitute a capacitor. The power source 31 supplies a load current I to a CPU 32.

Figure 5:
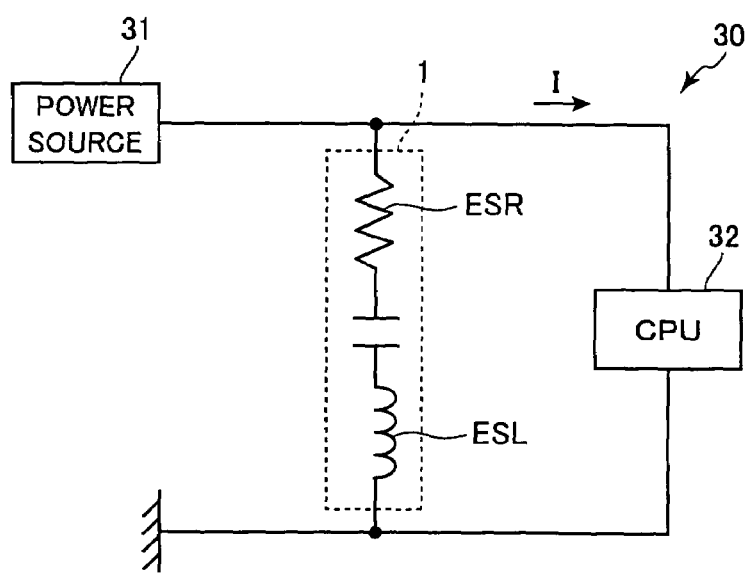
FIG. 5 is an equivalent circuit for the power supply circuit of FIG. 4.

FIG. 5 shows an equivalent circuit of the power supply circuit 30. As shown in FIG. 5, the multilayer capacitor 1 itself includes an equivalent series resistance (ESR) and an equivalent series inductance (ESL). The power source 31 supplies a load current I to the CPU 32. However, during transient changes in the load current I, the multilayer capacitor 1 supplies a current to the CPU 32, thereby suppressing voltage variations in the power source 31. At this time, the current in the internal electrodes 10A–17A flows in a direction indicated by arrows in FIG. 3.

Figure 6:
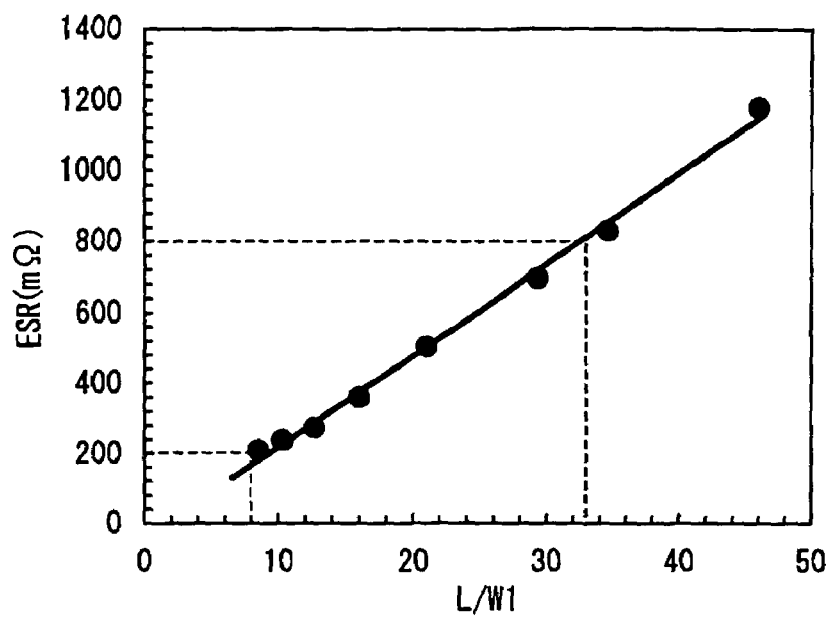
FIG. 6 is a graph showing changes in ESR in response to changes in the ratio (length L/width W1) within a prescribed range.

Next, the reason for configuring the length L and width W1 to satisfy the expression $8 \leq L/W1 \leq 33$ will be described. The results of studying changes in the ESR of the multilayer capacitor 1 having eight internal electrodes show that changes in the ESR are almost directly proportional to changes in the ratio L/W1 when L/W1 is varied within a prescribed range, as shown in FIG. 6. When L/W1 is less than 8, the ESR becomes smaller than 200 mΩ. If the ESR is less than 200 mΩ, the load current to the power source 31 begins to fluctuate suddenly in the power supply circuit 30, causing ringing and making it impossible to provide a stable power supply to the power source 31. Therefore, L/W1 has been set to 8 or greater.

On the other hand, if the ratio L/W1 exceeds 33, then the ESR becomes greater than 800 mΩ. When the ESR is greater than 800 mΩ, the response of voltage becomes poor and the voltage does not rise instantaneously to a rapid change of load current to the CPU 32, making it impossible to provide a stable power supply to the power source 31. Further, if the ratio L/W1 is greater than 33, the internal electrodes 10A–17A are very long and slender, inviting wear and breakage when printing the internal electrodes 10A–17A on the dielectric layers 2B–2I in the process of manufacturing the multilayer capacitor 1. Therefore, the L/W1 ratio has been set to 33 or less.

As described above, it is possible to maintain the ESR within a suitable range by setting the length L and width W1 to satisfy the expression $8 \leq L/W1 \leq 33$. Further, since the ESR and the ratio L/W1 are almost directly proportional with this configuration (see FIG. 6), a prescribed value of the ESR can easily be obtained. In addition, each of the internal electrodes 10A–17A has substantially the same shape, while the current in the internal electrodes 10A–17A adjacent to one another in the stacking direction flows in opposite directions. As a result, magnetic flux generated by the current flowing through adjacent internal electrodes effectively cancels each other, making it possible to reduce the ESL of the multilayer capacitor 1.

Further, since the current in the internal electrodes 10A–17A flows in the direction indicated by arrows in FIG. 3 during use, the current is flowing in opposite directions within each pair of the parallel parts 10A1–17A1. As a result, the magnetic flux generated by the current in these parallel parts effectively cancels each other, making it possible to reduce the ESL of the multilayer capacitor 1 even more. In this way, the present embodiment can both reduce the ESL of the multilayer capacitor 1 and easily set an optimal ESR, thereby more effectively suppressing voltage fluctuations in the power source 31.

The internal electrodes 10A–17A have a continuous shape (loop-back shape) that forms the pairs of parallel parts 10A1–17A1, making it possible to reduce the length of the multilayer capacitor 1. Further, since the width W1 of the internal electrodes 10A–17A is set larger than 100 μm, the internal electrodes 10A–17A can be printed on the dielectric layers 2B–2I during the process of manufacturing the multilayer capacitor 1 without a decline in printing precision and without breakage occurring in the internal electrodes 10A–17A. By configuring the width W2 of the extraction electrodes 10B–17B narrower than the width W1 of the internal electrodes 10A–17A, a sufficient distance can be maintained between adjacent internal electrodes 10A–17A, thereby preventing the occurrence of solder bridges when assembling the multilayer capacitor 1.

Next, a multilayer capacitor according to a second embodiment of the present invention will be described with reference to FIGS. 7 and 8.

Figure 7:
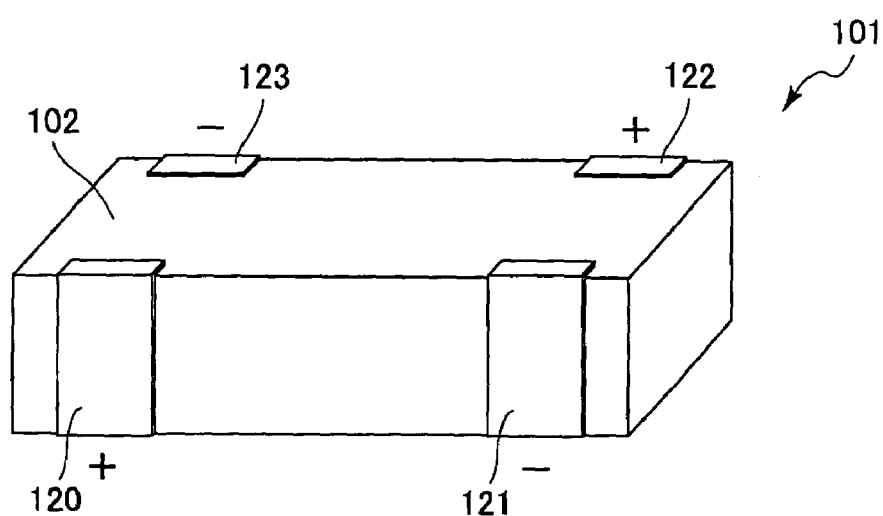
FIG. 7 is a perspective view of a multilayer capacitor according to a second embodiment of the present invention.
Figure 8:
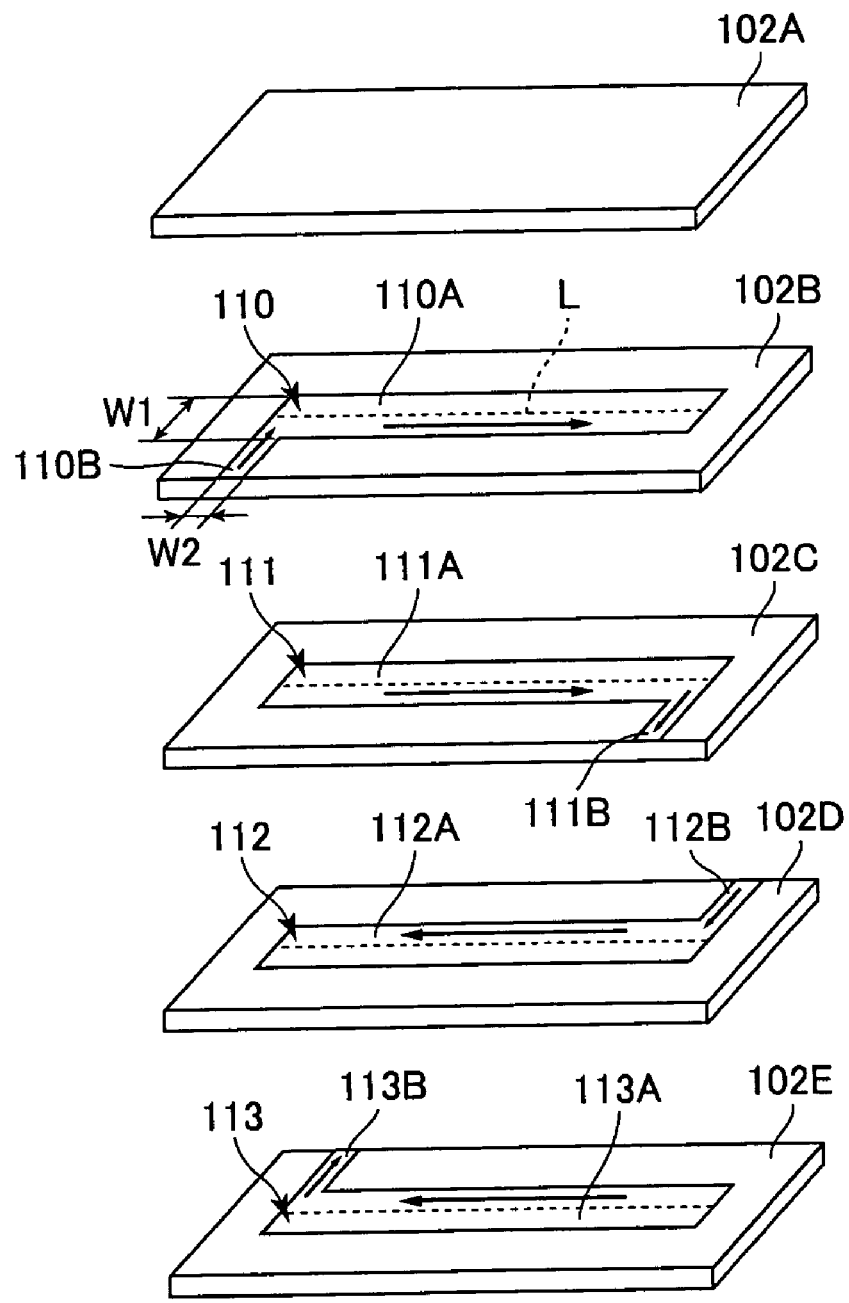
FIG. 8 is an exploded perspective view of the multilayer capacitor according to the second embodiment.

As shown in FIGS. 7 and 8, the multilayer capacitor 101 includes a dielectric element 102 having stacked sheet-like dielectric layers 102A–102E, first through fourth electrodes 110–113 disposed between the dielectric layers 102A–102E, and four external electrodes 120–123 connected to the first through fourth electrodes 110–113, respectively. The dielectric layers 102A–102E correspond to the dielectric layers 2A, 2B, 2E, 2F, and 2I of the first embodiment, and the first through fourth electrodes 110–113 correspond to the first, fourth, fifth, and eighth electrodes 10, 13, 14, and 17 of the first embodiment. Further, the external electrodes 120–123 correspond to the external electrodes 20, 23, 24, and 27 of the first embodiment.

The dielectric element 102 is manufactured in the same way as the dielectric element 2 according to the first embodiment. Further, the first through fourth electrodes 110–113 include respective internal electrodes 110A–113A that are substantially rectangular in shape, and extraction electrodes 110B–113B. Each of the internal electrodes 110A–113A is formed with a width W1 substantially uniform from one longitudinal end to the other and has a path of a length L running through the center of the width W1 from the one end to the other (indicated by a dotted line in FIG. 8). The width W1 and the length L are indicated only for the internal electrode 110A in FIG. 8. The length L and width W1 are set such that $8 \leq L/W1 \leq 33$, and $W1 \geq 100$ μm. The extraction electrodes 110B–113B also include a width W2 shown in FIG. 8 that satisfies the expression $W1 \geq W2$. The width W2 is indicated only for the extraction electrode 110B in FIG. 8.

Figure 4:
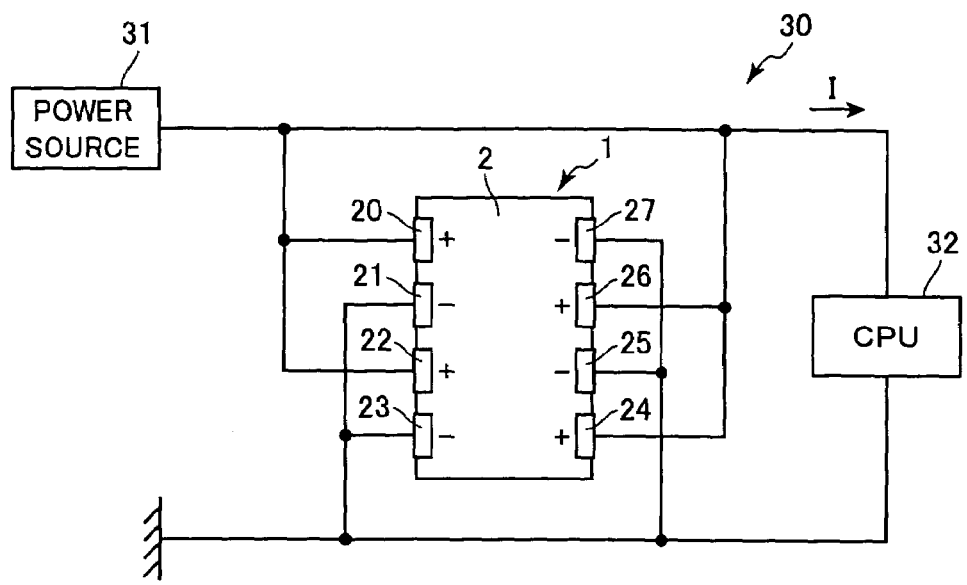
FIG. 4 is a circuit diagram for a power supply circuit when applying the multilayer capacitor according to the first embodiment.

The multilayer capacitor 101 of the second embodiment is used in the same power circuit shown in FIG. 4 in the first embodiment by connecting the external electrodes 120 and 122 to the power source 31 and the external electrodes 121 and 123 to ground in order to configure a capacitor with the internal electrodes 110A–113A. As with the multilayer capacitor 1 of the first embodiment, the multilayer capacitor 101 is also provided with an ESR and ESL (see FIG. 5). The multilayer capacitor 101 supplies an electric current to the CPU 32 during transient changes in the load current I supplied from the power source 31 to the CPU 32 in order to regulate voltage changes in the power source 31. At this time, the current flows through the internal electrodes 110A–113A in the direction indicated by arrows in FIG. 8.

By configuring the length L and width W1 of the multilayer capacitor 101 to satisfy the expression $8 \leq L/W1 \leq 33$, as in the multilayer capacitor 1 of the first embodiment described above, the multilayer capacitor 101 can maintain the ESR in a suitable range. Further, since the ESR is almost directly proportional to the L/W1, as shown in FIG. 6, it is easy to obtain an ESR of a desired value. The internal electrodes 110A–113A all have substantially the same shape so that the electric current flows in opposite directions in adjacent internal electrodes 110A–113A, thereby reducing the ESL in the multilayer capacitor 101. In this way, the second embodiment can not only reduce the ESL of the multilayer capacitor 101, but can also easily set a suitable ESR to further regulate the voltage in the power source 31.

Since the width W1 of the internal electrodes 110A–113A is set greater than 100 μm, the design does not result in a decline in printing accuracy when printing the internal electrodes 110A–113A on the dielectric layers 102B–102E in the process for manufacturing the multilayer capacitor 101, nor does the design invite breakage in the internal electrodes 110A–113A. Further, by setting the width W2 of the extraction electrodes 110B–113B narrower than the width W1 of the internal electrodes 110A–113A, a sufficient distance can be maintained between adjacent internal electrodes 110A–113A, preventing solder bridges or the like occurring when assembling the multilayer capacitor 101.

While the invention has been described in detail with reference to specific embodiments thereof, it would be apparent to those skilled in the art that many modifications and variations may be made therein without departing from the spirit of the invention, the scope of which is defined by the attached claims. For example, it is possible to provide an additional dielectric block similar to the dielectric layers 2B–2I on the side of the dielectric layer 2I opposite the dielectric layer 2H in the multilayer capacitor 1 of the first embodiment, and to extend the external electrodes 20–27 to the layer corresponding to the dielectric layer 2I in the added dielectric block.

What is claimed is:

1. A multilayer capacitor comprising:
    a dielectric element having stacked sheet-like dielectric layers and having an outer surface;
    internal electrodes each disposed between adjacent dielectric layers and within the dielectric element, each internal electrode being in elongated shape with a first end and a second end and having a length L from the first end to the second end and a width W orthogonal to the direction of the length L;
    extraction electrodes each disposed on the first end of each internal electrode leading the internal electrode to the outer surface of the dielectric element; and
    external electrodes each connected to each internal electrode via each extraction electrode;
    wherein the length L is the length of the internal electrode along the center of the width W, and the length L and the width W of the internal electrodes are set such that $8 \leq L/W \leq 33$.

2. The multilayer capacitor according to claim 1, wherein each of the internal electrodes has at least a set of parallel parts extending parallel to one another.

3. The multilayer capacitor according to claim 1, wherein a width of the extraction electrodes orthogonal to the direction in which the extraction electrodes extend is narrower than the width W of the internal electrodes.

4. The multilayer capacitor according to claim 1, wherein the width W of the internal electrodes is greater than or equal to 100 μm.

5. The multilayer capacitor according to claim 1, wherein the internal electrodes stacked adjacent to one another have substantially the same shape, but opposite polarities.

* * * * *